United States Patent [19]

Carr

[11] 3,862,800

[45] Jan. 28, 1975

[54] SLIDE TRANSPARENCY CASSETTE

[75] Inventor: Maurice K. Carr, Ann Arbor, Mich.

[73] Assignee: Argus Incorporated, Ann Arbor, Mich.

[22] Filed: Aug. 28, 1972

[21] Appl. No.: 284,159

[52] U.S. Cl............................ 353/113, 353/DIG. 1
[51] Int. Cl. .......................................... G03b 23/02
[58] Field of Search ....... 353/103, 112, 113, DIG. 1

[56] References Cited
UNITED STATES PATENTS

| | | | |
|---|---|---|---|
| 2,904,914 | 9/1959 | Trubert.............................. | 353/113 |
| 3,529,891 | 9/1970 | Mezhekov........................... | 353/113 |

FOREIGN PATENTS OR APPLICATIONS

| | | | |
|---|---|---|---|
| 229,736 | 8/1960 | Australia............................. | 353/113 |
| 1,195,578 | 11/1959 | France................................. | 353/113 |

*Primary Examiner*—Samuel B. Rothberg
*Assistant Examiner*—A. J. Mirabito
*Attorney, Agent, or Firm*—Wallenstein, Spangenberg, Harris & Strampel

[57] ABSTRACT

A cassette body is provided with a pair of horizontally spaced slide holding compartments each of a size to receive a single vertical stack of horizontally oriented slides in face-to-face relation. Open ended slide track interconnect the confronting upper and lower ends of the slide holding compartments, there being an opening in the bottom track constituting a slide projecting station. The cassette body is provided with separate slide pusher-receiving means adjacent the top and bottom of each of the slide holding compartments so that slide pusher means can engage the outer edge of a slide at the bottom or top of each of the compartments and advance the same to the adjacent upper or lower slide holding track. The cassette body is provided adjacent the bottom of each of the slide holding compartments with means for receiving a slide stack raising member which raises at least the side of the slide stack facing the exitway of the adjacent track so that the slide entering the bottom of the stack will not engage the edge of the adjacent slide of the stack above the same.

17 Claims, 13 Drawing Figures

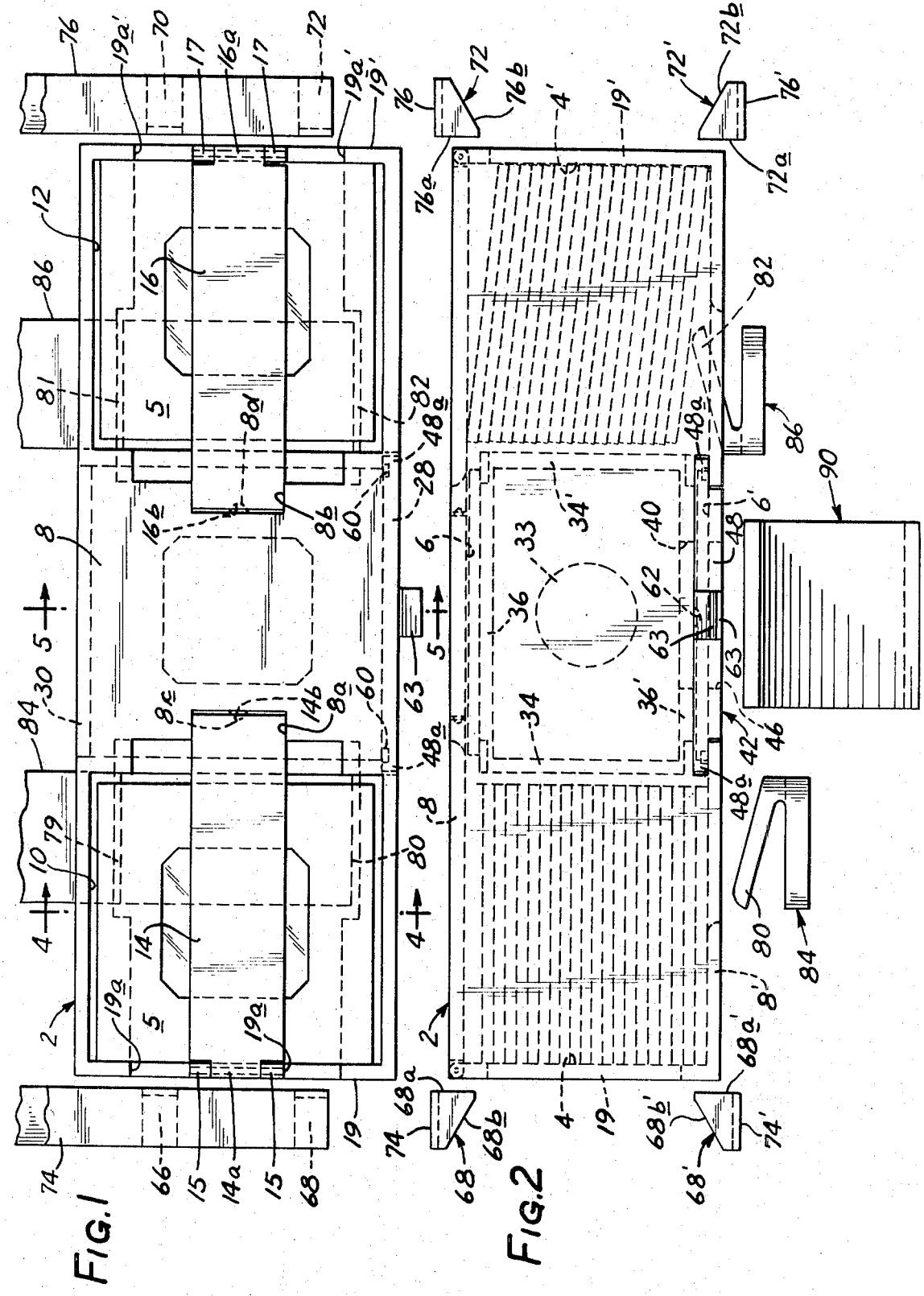

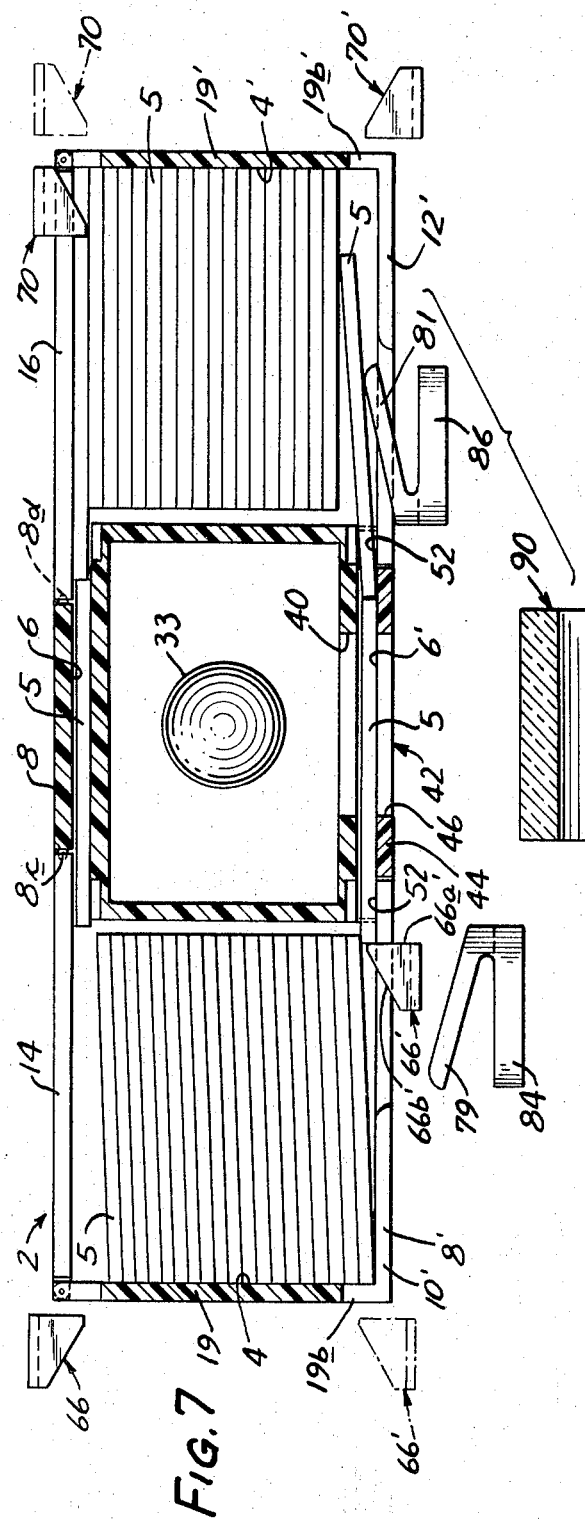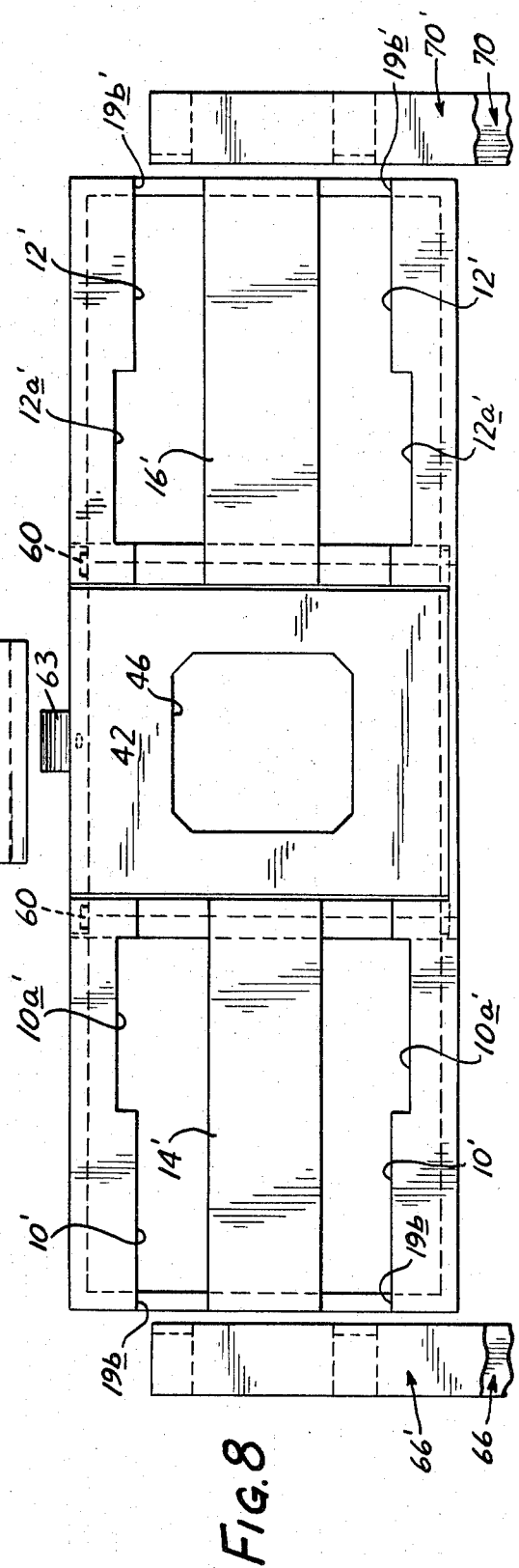

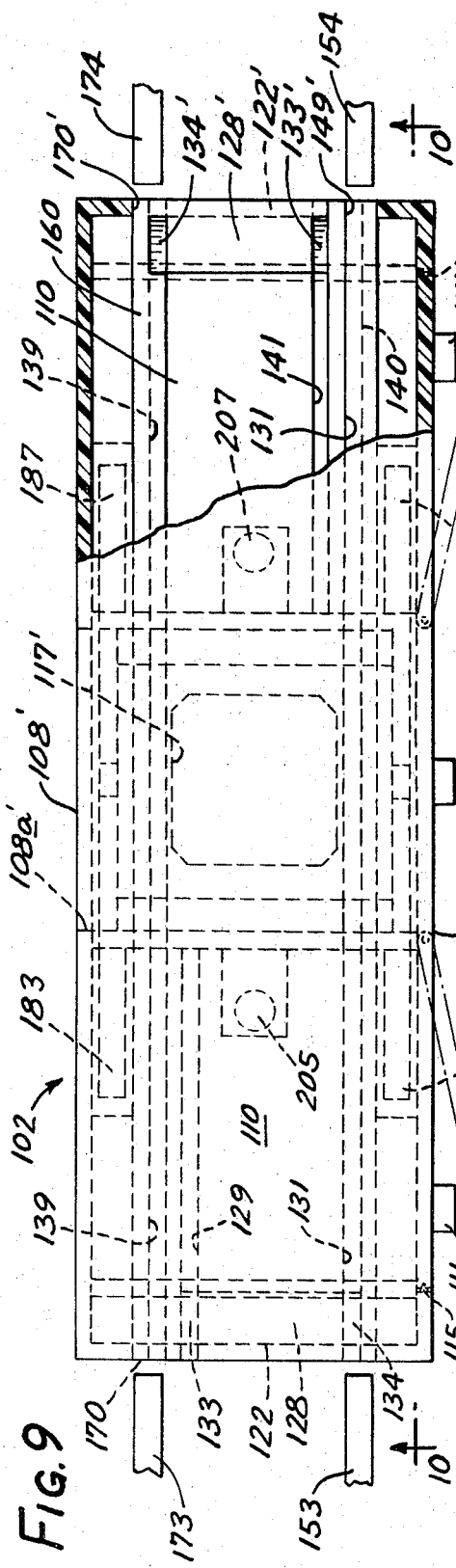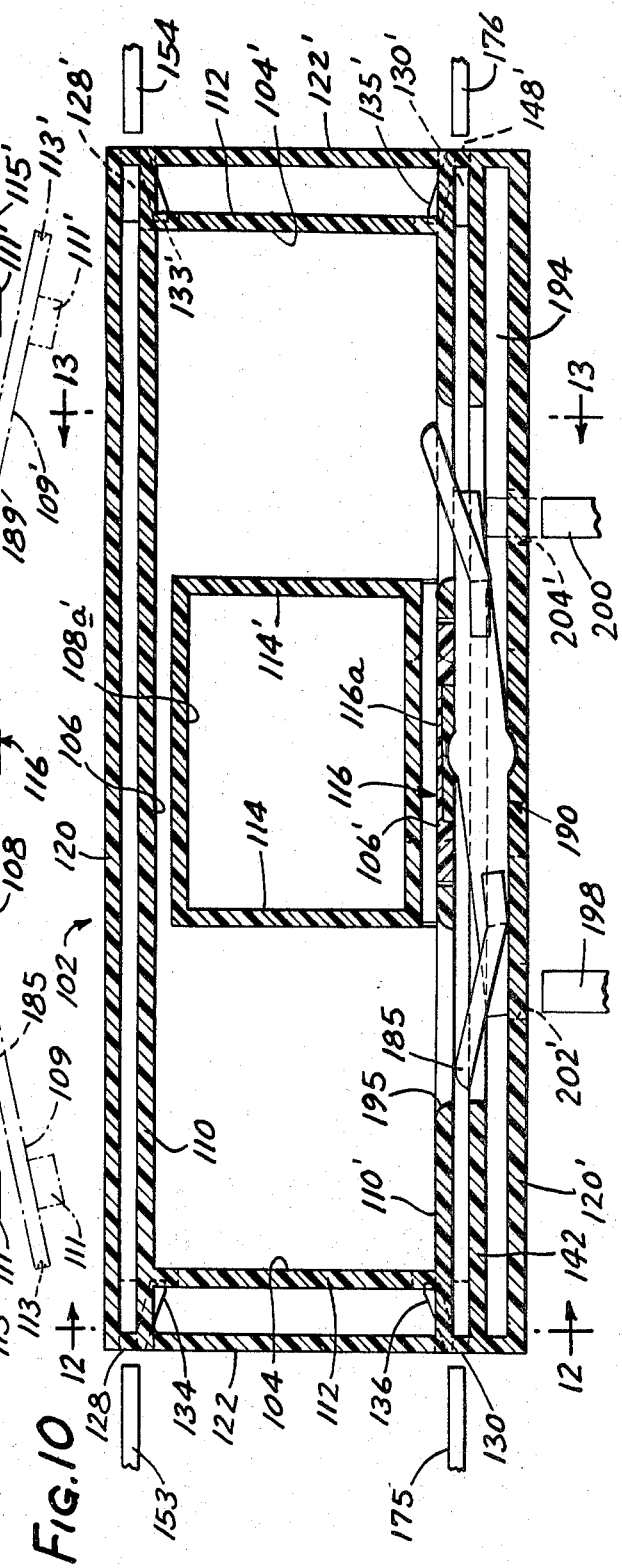

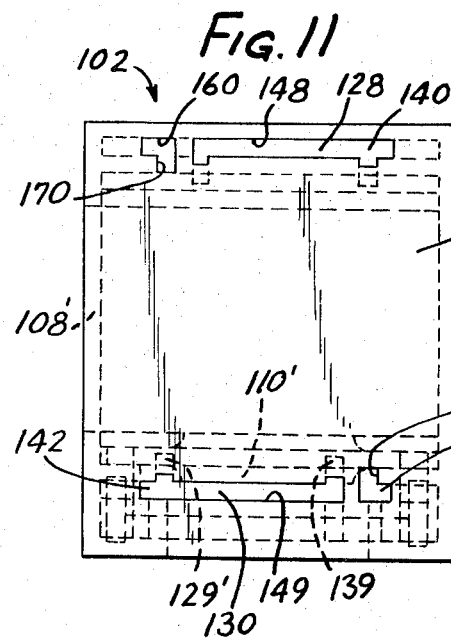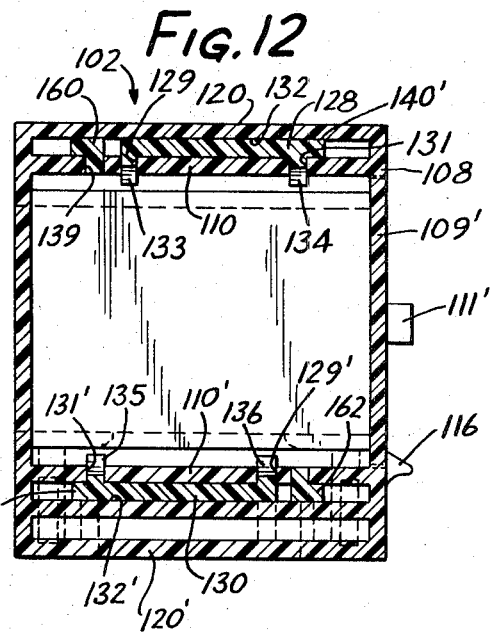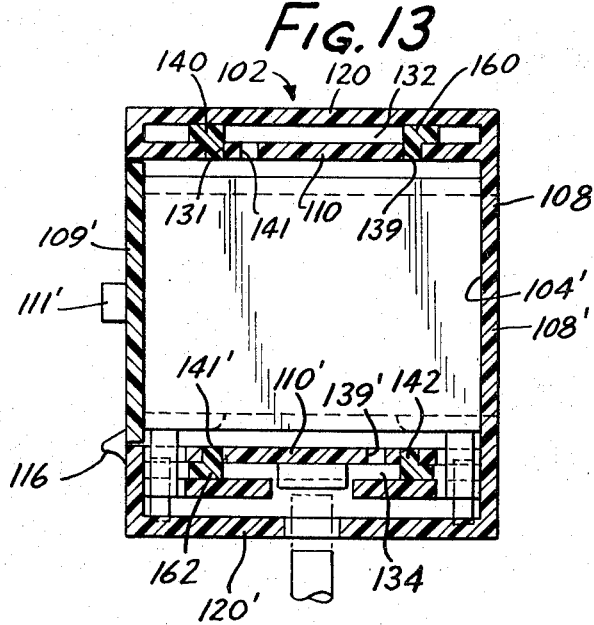

3,862,800

SLIDE TRANSPARENCY CASSETTE

The present invention relates to a unique slide transparency holding cassette of a type wherein the slides are in face-to-face stacked relationship and remain in the cassette both during storage and projection of the slides.

Slide transparencies are commonly stored in individual compartments in magazines adapted to be placed into a projector housing where the slides are temporarily removed one at a time from the magazine compartments during the projection thereof, and then returned to their initially assigned compartments. These compartmentalized magazines are relatively expensive to manufacture and take up a substantially greater storage space than the volume of the slides involved. Additionally, such a magazine requires magazine advancing means for progressively advancing the magazine during successive projection of slides, and the bending and jamming of slides during the removal and return of slides to the magazine is a common problem.

Slide projectors have been developed which receive cassettes in which the slides are in face-to-face stacked relationship, so that no individual slide compartments are provided in the magazine, thereby reducing the cost and size of the cassette in comparison to the aforementioned compartmentalized magazines. In the simplest form of such a cassette, after the cassette is inserted into a projector housing, the slides are removed one at a time from the cassette for projection, and after projection the slides are either stacked in another similar receiving cassette or in some cases are returned to the original cassette from which the slides were fed. Although these cassettes do not require progressive advancement as in the case of the compartmentalized magazines, the slides nevertheless must be removed from and then returned to the cassette, and so a problem of slide bending and jamming exists. Also, these cassettes have serious limitations in that it is not readily possible to reverse the order of slide projection, which is relatively easy to accomplish in compartmentalized magazines which merely have to be moved in a reverse direction to view slides which had been previously projected.

It has also been proposed to provide cassettes designed so that the slides are not removed from the cassette during the projection thereof, so that the problem of slide bending and jamming is minimized. Such a cassette is disclosed in U.S. Pat. No. 2,904,914 and Australian Pat. No. 229,736. As in the case of the cassette disclosed in the Australian patent, provision is made for continuously circulating slides in a given direction between two spaced compartments which are interconnected at the opposite ends thereof by open ended slide tracks, the viewing position of the slides being a position on one of the tracks between the compartments. In such an arrangement, slides can be continuously circulated in the same direction through the two compartments. However, this type of cassette has left much to be desired from the standpoint of the inability to edit the slides in the cassette, and also from the standpoint of effecting both forward or reverse movement of the slides in the cassette.

The present invention provides a cassette of the type where the slides remain in the cassette during projection and wherein, because of the unique simple construction and arrangement thereof, the slides can be moved in one direction or the other in the cassette to any desired degree, permitting selectively continuous repetitive projection of slides or a reverse order of projection, so that a slide which has just been previously projected can be projected again without feeding the entire group of slides past the projection station.

In accordance with one of the specific features of the invention, a cassette body is provided with horizontally spaced slide holding compartments each of a size to receive a single verticle stack of horizontally oriented slides in face-to-face relation. Open ended slide tracks interconnect the confronting upper and lower ends of the slide holding compartments, there being an opening preferably in the bottom track constituting a slide projecting station and through which slide projection light is passed to project a slide transparency. The slide tracks are preferably only of a size to accommodate one slide to provide a cassette of maximum compactness. The cassette body is provided with separate slide pusher-receiving means adjacent the top and bottom of each of the slide holding compartments, so that slide pusher means can engage the outer edge of a slide at the bottom or top of each of the compartments and advance the same to the adjacent upper or lower slide holding track. The slide pusher means can be an integral part of the cassette body or can be a part of the projector. Thus, by operating the slide pusher means at the bottom of one of the compartments and the top of the other compartment, the bottom slide pusher means will simultaneously advance the slide at the bottom of the slide stack involved into the lower projection station-forming slide track for projection, the slide so advanced pushing the slide previously projected into the bottom of the other compartment, while a slide at the top of the stack in the latter compartment is pushed into the upper slide track to push the slide previously in the upper slide track into the top of the stack of slides in said former compartment. This provides for a continuous circulation of slides between the compartments in a given direction, when the aforementioned slide pusher means are operated following each projection operation. Similarly, by operating the slide pusher means at the top of said former compartment and at the bottom of said latter compartment, slides can be circulated between the compartments in the other direction.

To permit the movement of slides in the bottom slide projection station forming track in either direction into the bottom of one or the other of said slide holding compartments, the cassette body is provided adjacent the bottom of each of the slide holding compartments with means for receiving a slide stack raising member which raises at least the side of the slide stack facing the exitway of the adjacent track so that the slide entering the bottom of the stack involved will not engage the edge of the adjacent slide of the stack above the same to cause jamming of the slides. The slide stack raising member can be an integral part of the cassette body or can be part of the projector.

Another feature of the invention is to provide a means for editing a slide previously fed into the cassette, or for editing slides during the placement of slides into the cassette, while the cassette is mounted in the projector housing. To this end, the slide projection station forming track is provided with a removable bottom section or tray upon which a slide is fed from either of the compartments. The tray is removable into a position which exposes the slide, so that it can be removed and reinserted into the tray or replaced by another slide.

The cassette above described can accommodate different numbers of slides from a minimum capacity (for continuous operation) of one stack plus three additional slides to a maximum capacity of the two slide holding compartments plus one or two slides. To enable each of the slide holding compartments to receive a stack of slides in a relatively easy manner, a movable wall or cover means is provided on one side or end of each of the compartments, so that individual stacks of slides can be quickly and easily placed within these compartments.

Other features of the invention deal with the specific details for carrying out the broader features of the invention reviewed above.

The above described and other features and advantages of the invention will become apparent upon making reference to the specification to follow, the claims and the drawings wherein:

FIG. 1 is a top view of an exemplary slide transparency cassette constructed in accordance with the features of the present invention, the cassette being shown mounted in a projector with projector mounted slide pushing, slide stack lifting and other apparatus disposed in operative relation thereto;

FIG. 2 is a front view of the cassette and projector mounted apparatus shown in FIG. 1 which cooperates therewith;

FIG. 7 is a longitudinal transverse vertical sectional view through the cassette and projector mounted apparatus, when the latter apparatus is in the process of circulating slides in a counterclockwise direction within the cassette;

FIG. 8 is a bottom view of the cassette and projector mounted apparatus shown in FIG. 7, FIG. 9 is a top view, partly broken away, of a modified cassette which forms a substantially dust-free enclosure for the slides;

FIG. 10 is a longitudinal sectional view through the cassette of FIG. 9, taken along section line 10—10;

FIG. 11 is a lefthand elevational view of the cassette of FIGS. 9 and 10;

FIG. 12 is a vertical transverse sectional view through the cassette of FIGS. 9-11 taken along section line 12—12; and FIG. 13 is a transverse sectional view through the cassette of FIGS. 9-12 taken along section line 13—13 in FIG. 10.

Figure 5:
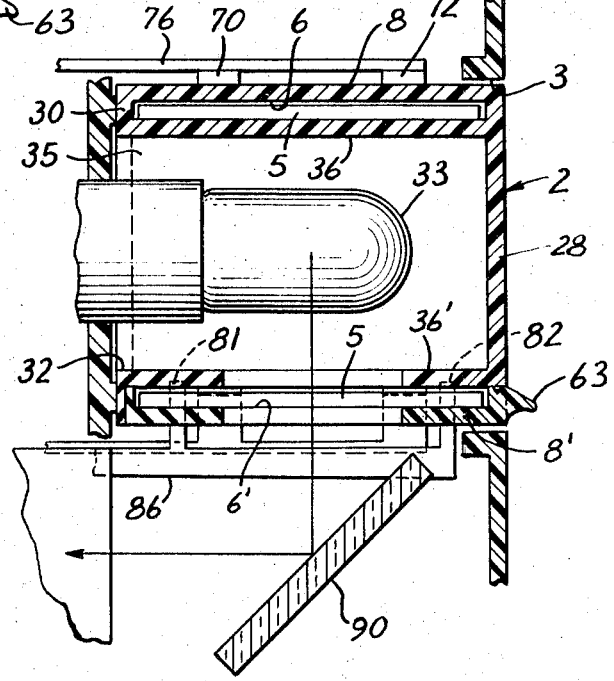
FIG. 5 is a vertical transverse sectional view through the cassette and projector mounted apparatus of FIGS. 1-4, taken along section line 5—5 in FIG. 1.

Referring now to the drawings, a unique slide transparency cassette 2 is shown therein which, for the most part, if desired, may be made of molded synthetic plastic material forming a horizontally elongated rectangular cassette body adapted to be bodily inserted into or removed from a projector housing provided with a suitable cassette insertion opening 3 (see FIG. 5) for receiving the same. The cassette body contains slide transparencies 5 of the usual construction which consists of a cardboard or plastic frame in which is mounted the developed film transparency. The size of the cassette body depends upon the size of the slides involved, which in the case of the slides produced from pocket sized cameras are so small that the cassette 2 becomes an exceedingly small and compact unit. The number of slides to be accommodated in the cassette 2 depends upon the manner in which the cassette is to be used. If it is desired to continuously recirculate slides in the same direction through the cassette, the cassette shown must have a minimum of 21 slides, for reasons to be explained. The cassette could be used however with a lesser number of slides if continuous circulation of slides is not desired. The illustrated cassette can hold up to approximately 40 slides, although it is obvious that any number of slides can be accommodated by making the cassette larger, in which event the minimum number of slides necessary for continuously circulating slides would be proportionately greater.

The cassette body has horizontally spaced slide holding compartments 4 and 4' which, in the most compact version of the cassette, are preferably spaced apart a distance approximately the length of one slide. An upper open ended track 6 interconnects the confronting top or upper ends of the slide holding compartments 4 and 4' and a lower open ended slide track 6' interconnects the bottom or ends of the slide holding compartments 4 and 4'.

The upper extremities of the slide holding compartments 4 and 4' and the upper and lower slide tracks 6 and 6' are defined respectively by upper and lower rectangular elongated walls 8 and 8'. The upper wall 8 has rectangular slide stack receiving openings 10 and 12 respectively positioned over the slide holding compartments 4 and 4', and are of a size to receive stacks of slides placed respectively in the slide holding compartments 4 and 4'. The slide stack receiving openings 10 and 12 in the upper wall 8 may be partially closed by a pair of closure panels 14 and 16 which may be mounted for pivotal movement between open and closed positions by any suitable means. As illustrated, the closure panels 14 and 16 have reduced end portions 14a and 16a which by any suitable means, as by pivot forming extension, are pivotally mounted within pivot-forming blocks 15—15 and 17—17 respectively projecting upwardly from vertical end walls 19 and 19' of the cassette body. The inner ends of the closure panels 14 and 16 may fit into notches 8a and 8b, and may be releasably locked into their closed positions by any suitable means, such as by the provision of recesses 14b and 16b provided in the ends of the closure panels 14 and 16 which receive resilient locking nibs 8c and 8d projecting from the margins of the notches 8a and 8b in upper wall 8.

The cassette body end walls 19 and 19' are respectively provided with pairs of notches 19a—19a and 19a'—19a' communicating with the openings 10 and 12 in the upper wall 8 to define clearance passageways for the horizontal movement of slide pusher members to be described, adapted to engage the exposed outer edges of the upper slide of the stacks of slides in the slide holding compartment 4 and 4'. In this fashion, an upper slide in a full stack of slides can be respectively moved into the upper slide track 6 from either slide holding compartment 4 or 4'.

The lower wall 8' of the cassette body is provided opposite the bottom of the lefthand slide holding compartment 4 with a pair of openings 10' and 10' which open onto a pair of notches 19b and 19b formed at the bottom of the cassette body end wall 19. The notches 19b—19b and openings 10'-10' form clearance passageways for the movement of slide pusher members to be described which move to the right against the exposed bottom edge of a bottom slide in the stack of slides in the lefthand slide holding compartment 4 and push the same into the bottom slide track 6' in a manner to be described. The openings 10' and 10' in the lower cassette body wall 8' adjacent the slide holding compartment 4 have outer portions 10a' and 10a' which provide clearance for the movement of slide shifting members to be described which move from a point outside the confines of the slide holding compartment to a point within the slide holding compartment 4, where it raises the side of the stack of slides facing the lower slide track 6' above the level of the same to permit the easy entry of a slide into the bottom of the stack involved from the lower slide track 6'.

The portion of the lower wall 8' opposite the righthand slide holding compartment 4' has a pair of openings 12' and 12' which communicate with notches 19b' and 19b' formed in the bottom of the other cassette body end wall 19'. The notches 19b' and 19b' form the same function as the notches 19b' and 19b' just described in forming with the openings 12' and 12' clearance passageways for the horizontal movement of slide pushing members to be described which engage the exposed edge of the bottom slide of a stack of slides in the slide holding compartment 4' and push the same into the lower slide track 6'. The openings 12' and 12' in the lower wall 8' have the same shape as the aforementioned openings 10' and 10' in the lower wall 8', and thus are provided with portions 12a' and 12a' adapted to permit the passage of slide stack shifting members to be described which move into the slide holding compartment 4' from a point therebelow to raise at least the portion of a stack of slides in the slide holding compartment 4' facing the lower slide track 6' above the track permitting the ready passage of a slide from the lower slide track 6' into the bottom of the stack of slide in the slide holding compartment 4'.

The cassette body has an elongated rectangular front wall 28 and a similarly sized elongated rectangular rear wall 30 provided with an opening 32 (FIG. 5) permitting the cassette body to be moved around a projection lamp 33 extending horizontally from a wall of the projector housing. The projector lamp 33 fits into a space 35 (FIG. 5) formed within the cassette body between the slide holding compartments 4 and 4' and the slide tracks 6 and 6'.

The confronting inner extremities of the slide holding compartments 4 and 4' are defined by spaced vertical walls 34 and 34' in which openings are formed to provide for the entryways into the upper and lower slide tracks 6 and 6' from the slide holding compartments 4 and 4'. Horizontally extending upper and lower track-forming walls 36 and 36' extend between the front and rear walls 28 and 30 and the aforementioned vertical walls 34 and 34' respectively to define the bottom extremity of the upper slide track 6 and the upper extremity of the lower slide track 6'. The lower wall 36' is provided with a projection opening 40 of the size of the picture-forming portion of the film transparency involved and so the lower slide track 6' defines a slide projecting station for the cassette. While theoretically, a slide projecting station could be formed in the upper slide track 6 by providing a suitable opening in the wall 36, (some aspects of the invention are useful with such a modification), it is most advantageous and a specific aspect of the invention to form the slide projecting station in the lower slide track 6', since this results in greater simplicity in construction of the cassette and the ability of the cassette to be used for continuous circulation of slides in one direction or the other for a minimum number of slides in the cassette 2.

Figure 3:
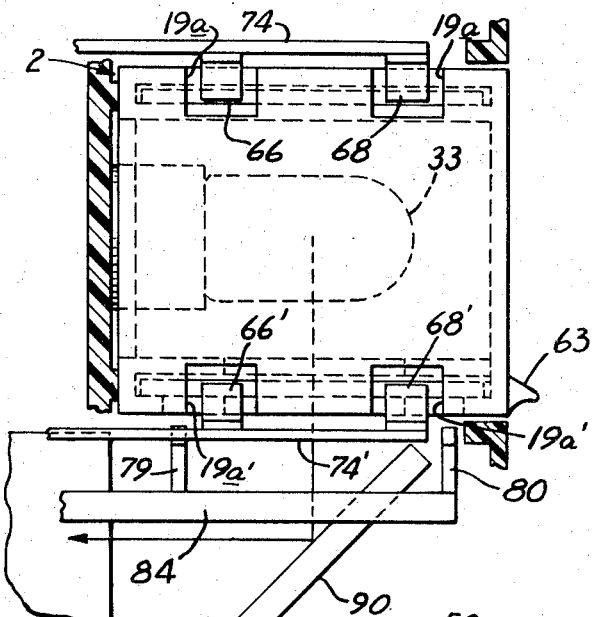
FIG. 3 is an end view of the cassette and projector mounted apparatus of FIGS. 1 and 2, viewed from the lefthand end of FIG. 1.
Figure 4:
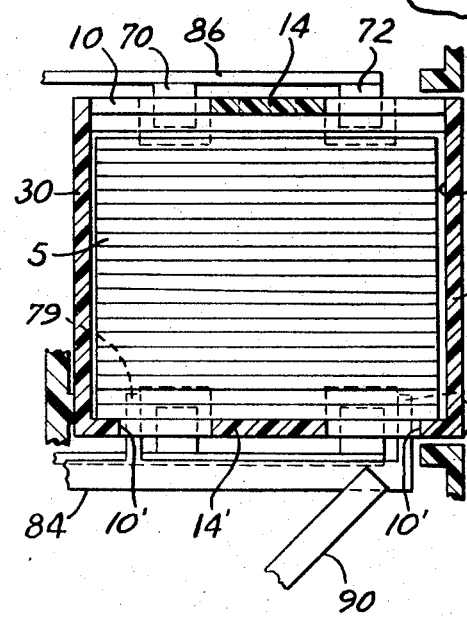
FIG. 4 is a vertical transverse sectional view through the cassette and projector mounted apparatus of FIGS. 1-3, taken along section line 4—4 in FIG. 1.
Figure 6:
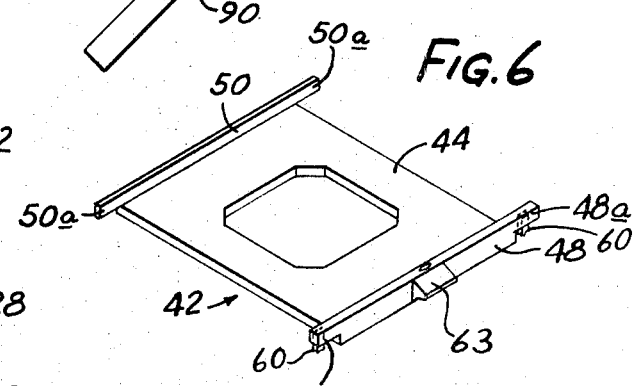
FIG. 6 is a perspective view of a slide editing tray forming part of the cassette shown in FIGS. 1-5.

The bottom extremity of the lower slide track 6' is provided by the bottom wall 44 of a slide editing tray generally indicated by reference numeral 42, which is slidably disposed in the bottom portion of the cassette body at a point between the slide holding compartments 4 and 4'. The bottom wall 44 of the slide editing tray has a light projection opening 46 in alignment with the light projection opening 40 in the cassette body wall 36'. The bottom wall 44 of the slide editing tray terminates in an upwardly extending front wall 48 at its front margin and an upwardly extending rear wall 50 at its rear margin, the walls 48 and 50 and the bottom wall 44 defining an open ended tray approximately the size of one of the slides 5 as best shown in FIG. 6. The upper extremities of the front and rear walls 48 and 50 are contiguous to the cassette body wall 36. As illustrated, the outer ends of the front and rear walls 48 and 50 have outwardly projecting end portions 48a—48a and 50a—50a which are respectively slidably disposed within horizontally extending guide channels 52—52 formed by the cassette body (FIG. 7). In this manner, the slide editing tray 42 is supported for horizontal sliding movement within the channels 52—52, between a position where the slide tray forms part of the lower slide track 6' extending between the bottom portions of the slide holding compartments 4 and 4' and a position where it projects from the cassette body to fully expose a slide supported on the slide tray, so that the operator can remove such a slide and reinsert the same slide or replace the same by another slide. The extent to which the slide editing tray 42 can be pulled from the cassette body is limited by posts 60 and 60 projecting upwardly in the path of travel of the rear wall projections 50a—50a. When the slide editing tray is fully inserted within the guideway channels 52—52 the posts 60 and 60 fit within recesses in the front wall projections 48a and 48a. The slide editing tray may be removably locked into place by any suitable means, such as by projections 62—62 extending downwardly from the bottom portion of the front wall projections 48a—48a and complementary recesses formed in the cassette body.

In the form of cassette shown in FIGS. 1-8, the various slide feeding and slide stack lifting members are mounted on the projector housing. (However, the present invention envisions the mounting of such members upon the cassette body and, in such case, these members are externally operated by projector mounted instrumentalities.) To this end, when the cassette body is mounted within the projector housing, the various aforementioned pairs of cassette end wall notches 19a—19a, 19a'—19a', 19b—19b and 19b'—19b' are positioned opposite corresponding pairs of slide pusher members 66–68, 70–72, 66'–68' and 70'–72' which, as illustrated, are respectively carried on different respective horizontally reciprocated resilient arms 74, 76, 74' and 76'. The diagonally oppositely disposed pairs of pusher member carrying arms 74–76' and 74'–76 operate together in a manner to be described, to circulate slides in a clockwise or counterclockwise direction.

The pairs of slide pusher members respectively have vertically extending cassette facing sides 66a–68a, 70a–72a, 66a'–68a' and 70a'–72a' for engaging and pushing the adjacent edge of a slide in the associated slide holding compartment. The pairs of slide pusher members have inclined sides 66b–68b, 70b–72b, 66b'–68b' and 70b'–72b' which, upon the return movement of the pair of pusher members involved, slide over the edge of the slide involved as the associated operating arm is deflected.

Mounted opposite each of the portions 10a'—10a' and 12a'—12a' of the aforementioned openings 10'—10' and 12'—12' in the cassette body bottom wall 8' are pairs of slide stack shifting or lifting members 79–80 and 81–82 carried on respective operating arms 84 and 86, which arms are each movable between a lowered position where the pairs of lifting members carried thereby are located below the adjacent slide-holding compartment and raised positions where the pair of lifter mebers involved pass into the associated slide holding compartments to raise a stack of slides therein above the adjacent end of the lower slide track 6'. In FIGS. 2 and 7 the pair of slide stack lifting members 79–80 are shown in their lowered positions and the slide stack lifter members 81–82 are shown in their raised positions. These are the positions of the slide stack lifter members when slides are to be circulated in a counterclockwise direction through the cassette body.

The slide projector used with the cassette is provided with control means (not shown) with different positions for respectively effecting counterclockwise and clockwise movement of slides through the cassette as viewed in the drawings. When this control means is adjusted for a counterclockwise circulation of slides in the cassette, the lefthand lifter member carrying arm 84 will be in its lowered position and the righthand lifter member carrying arm 86 will be in its raised position, as shown in FIGS. 2 and 7. Any stack of slides in the right compartment 4'will thereby be raised as illustrated. Then, when a slide changing operation control is operated, the lower lefthand slide pusher carrying arm 74' will be moved to the right as viewed in the drawing, and the upper righthand slide pusher member carrying arm 76 will be moved to the left as viewed in the drawings. The latter movement of the arm 76 may be delayed with respect to the movement of arm 74'. Thus, the pair of pusher members 66'–68' will move through the notches 19b—19b in the bottom of the lefthand cassette body end wall 19 to engage the exposed edge of the bottommost slide in the stack of slides in the lefthand slide compartment 4 and push the same to the right into the lower slide track 6'. When the pusher members 66'–68' have reached their furthest righthand position, the latter slide is in a position within the slide track where the picture portion of the slide involved is in alignment with the projection openings 40 and 46. Any slide which was previously in the lower slide track 6' will be pushed by the slide just moved into the lower slide track 6' over the raised lifter members 81 and 82 into the righthand slide holding comparment 4'. When the slide moving into the slide holding compartment 4' has reached a position where it raises the stack of slides into a position where the upper righthand pusher members 70 and 72 can engage the edge of the uppermost slide in the stack involved, the arm 76 carrying the latter pusher members is then moved to the left, so the pusher members 70 and 72 engage the uppermost slide and push the same into the upper slide track 6. The movement of the slide into the upper slide track 6 will, in turn, push any slide in that slide track into the top of the stack of slides in the lefthand slide holding compartment 4.

When there is a full stack of slides in the right slide holding compartment 4', so that the movement of the pusher members 70 and 72 will be effective in moving a slide into the upper slide track 6, there can be no continuing circulation of slides in the cassette unless there is also still a slide in the lower slide track 6' and in the lefthand slide holding compartment 4. For example, if at the time a slide is fed into the upper slide track 6 there are no slides in the lefthand slide holding compartment, there can be no more movement of a slide into the lower slide track 6' to bring another slide into the bottom of the righthand slide holding compartment 4' to permit the feeding of another slide into the upper slide track 6.

If it is desired to circulate slides in a clockwise direction in the cassette as viewed in the drawings, then the controls of the projector will be so operated that the projector will raise the lefthand slide stack lifter member carrying arm 84 into a slide stack raising position and lower the righthand slide stack lifter member carrying arm 86 to drop the slide stack in the righthand slide holding compartment 4' to its bottommost position where the righthand bottom slide pusher members 70' and 72' can be effective to advance the bottommost slide in the righthand slide holding compartment 4' to the lower slide track 6'. In such case, when a slide changing operation control is operated, the righthand lower slide pusher members 70' and 72' will be moved to the left to push the bottom slide involved into the lower slide track 6', whereupon the slide previously in the lower slide track 6' will be moved into the bottom of the lefthand slide holding compartment 4 to an extent where it raises a full slide stack therein to a point where the lefthand upper slide pusher members 66 and 68 can be effective to engage the uppermost slide in such a full stack. Then, the latter pusher members will be moved to the right to effect movement of the uppermost slide of a full stack of slides in the left slide holding compartment 4 into the upper slide track 6.

The various slide pusher member carrying arms 74, 76, 74' and 76' when operated are reciprocated back and forth once to bring the arms to their initial positions illustrated.

When a slide is resting at the slide projecting station upon the slide emitting tray 42, light from the aforementioned projection lamp 33 will be directed through the film transparency involved, where the light may strike an inclined mirror 90 which directs the light beams horizontally through lens elements (not shown) where they can be projected conveniently on a vertical screen, wall surface or the like in the room where the slide projection is taking place.

The cassette 2, because it must be provided with relatively large openings especially at the top of the cassette for permitting the passage of the slide pusher members 66–68 and 70–72, does not offer a very good protection for the slides against falling dust and so such cassettes should be stored in a cardboard box or the like. Also, because the slides can tilt within the slide holding compartment 4 and 4' where only a few slides are contained therein it is possible for a slide to tilt and drop out of the cassette through the openings 10 and 12, should the cassette be inverted. Reference should now be made to FIGS. 9–13 which illustrates a cassette 102 in which the slides 5 are substantially protected against fall of dust, and also wherein the slides are substantially fully confined in horizontally spaced slide holding compartments 104 and 104' thereof so that they cannot readily drop therefrom, no matter what the orientation of the cassette may be.

The upper ends of the slide holding compartments 104 and 104' are interconnected by an upper slide track 106 and the lower extremities of the slide holding compartments are interconnected by a lower slide track 106'. The rear extremities of the slide holding compartments 104 and 104' are defined by a rear vertical wall 108' and the front extremities of the slide holding compartments are defined by doors 109 and 109' covering openings in a front outer vertical wall 108. The doors when opened fully expose the slide holding compartments 104 and 104' to permit the insertion of a stack of slides in each compartment. Each door 109 and 109' has a handle 111 or 111' and a depression 113 or 113' to receive a locking nib 115 or 115' projecting from the cassette body. The top and bottom extremities of the slide holding compartments and the upper and lower slide tracks are defined by interior upper and lower horizontal walls 110 and 110'. The bottom interior wall 110' has an opening 111' therein into which fits the bottom wall for the passage of light from a projection lamp or the like. The bottom of the lower slide track 106' is closed off by the apertured bottom wall 116a of a pull out slide editing tray 116, which may be identical to that previously described in connection with the cassette 2 of FIGS. 1–8. The longitudinal extremities of the slide holding compartment 104 are defined by longitudinally spaced interior vertical walls 112 and 114, and the longitudinal extremities of the slide holding compartment 104' are defined by longitudinally spaced interior vertical walls 112'–114', the walls 114 and 114' having openings for the entryways to the upper and lower slide tracks 106 and 106'. The rear wall 108' of the cassette body is provided with an opening 108a' to permit the placement of the cassette around the projection lamp (not shown).

The cassette 102 includes within it slide pusher members and slide stack lifting members to be described (which, in the embodiment of the invention previously described, were projector mounted elements). To provide clearances for the mounting of the slide pusher members and slide stack lifter members, the cassette body is provided with outer top and bottom walls 120 and 120' respectively spaced above and below the interior horizontal top and bottom walls 110 and 110' to define therebetween various passageways and clearance spaces for the mounting and movement of the slide pusher or slide stack lifter members. Also, the cassette has outer vertical end wall members 122 and 122' spaced from the aforementioned interior vertical walls 112 and 112' to form clearance spaces for a pair of upper laterally extending pusher member carrying arms 128 and 128' and a pair of laterally extending lower pusher member carrying arms 130 and 130' at opposite ends of the cassette body. The upper and lower pairs of pusher member carrying arms 128–128' and 130–130' are movable respectively in upper and lower clearance spaces 132 and 132' defined between the upper spaced horizontal walls 120 and 110, the lower spaced horizontal walls 120' and 110' and the outer end walls 122 and 122. The upper pair of pusher member carrying arms 128 and 128' respectively have depending therefrom through longitudinal slots 129–131 and 139–141 in the upper interior horizontal wall 110 respective pairs of slide pusher members 133–134 and 133'–134', which are initially positioned in the portions of the aforementioned spaces 132 and 132' beyond the interior end walls 112 and 112'. Similarly, the lower pair of pusher member carrying arms 130 and 130' have extending upwardly therefrom through longitudinal slots like 129'–131' and 139'–141' in the lower interior horizontal wall 110' respective pairs of laterally spaced slide pusher members like 135–136 and 135' (the other slide pusher member forming a pair with slide pusher member 135' is not visible in the drawings) which are initially positioned in the portions of the aforementioned spaces 132 and 132' beyond the interior end walls 112 and 112'. The arms 128–128' and 130–130' are limited in their inward movement by the vertical walls 114 and 114'.

The various pairs of slide pusher members form resilient extensions from the associated pusher member carrying arms and are shaped similarly to the aforementioned pusher members described in connection with the embodiment shown in FIGS. 1–8, so that upon reciprocation thereof they engage and move a slide into the upper or lower slide track and upon return movement thereof pass over the edge of a slide which may have been raised to the elevation thereof.

The upper and lower pusher member carrying arms 128 and 130 at one end of the cassette body, as illustrated, are respectively connected to longitudinally extending angle-shaped rods 140 and 142 sliding against the interior upper and lower horizontal walls 110 and 110' and guided for longitudinal movement in the longitudinal slots 131 and 131' formed in the walls 110 and 110'. The rods 140 and 142 are the same length as the long dimension of the cassette body and are respectively exposed and passable through pairs of openings like 148–149' and 148' in the opposite end walls 122 and 122' (the opposite opening 148 not appearing in the drawings) so that they can be engaged by longitudinally movable operator rods like 153—153 which can reciprocate the aforementioned rods 140 and 142 back and forth to enter and leave the pairs of opening to effect slide feeding operations like that previously described.

The upper and lower pusher member carrying arms 128' and 130' at the other end of the cassette body, as illustrated, are connected to similar longitudinally extending angle-shaped rods 160 and 162 sliding against the interior upper and lower horizontal walls 110 and 110' and guided in slots 131' and 164' formed in the walls 110 and 110'. The rods 160 and 162 are of the same length as the cassette body and are exposed to the outside thereof and are passable through respective pairs of openings like 170–170' and 173 in the opposite end walls 122 and 122'. The rods 160 and 162 are reciprocated back and forth within the cassette body by pairs of projector mounted pusher rods, like rods 173–174 and 175–176, which are reciprocated so as to enter and leave the aforesaid pairs of openings 170–170' and 173.

In FIGS. 9–13, the aforementioned cassette mounted lifter members comprise a pair of laterally spaced lifter members 183 and 185 mounted on one side of the lateral center line of the cassette body and a pair of laterally spaced lifter members 187 and 189 mounted at the other side of the lateral center line of the cassette body. The pairs of lifter members 183–185 and 187–189 are supported upon a rockable frame 190 mounted for pivotal movement about the horizontal lateral transverse center line of the cassette body in the space 194 between the interior bottom horizontal walls 110' and 120'. The outer bottom wall 120' has openings 195 and 197 through which the pairs of lifter members 183–185 and 187–189 can be selectively projected to lift the stack of slides above the same. When the frame 190 is rocked in one direction, the pair of lifter members 187 and 189 are raised into the righthand slide holding compartment 104', and when the frame 190 is tilted in the other direction the latter lifter members drop below the bottom of the righthand slide holding compartment 104' and the other lifter members 183 and 185 are raised from a position below the bottom of the lefthand slide holding compartment 104 to a point above the bottom thereof where it raises the stack of slide thereabove.

The frame 190 is rocked in one direction or the other by any suitable projector mounted means, such as by a pair of lifter rods 198 and 200 (FIG. 10), which are projectable upwardly through openings 202' and 204' in the outer bottom wall 120' selectively to engage arms 205 or 207 (FIG. 9) projecting from the frame 190 to tilt the frame in one direction or the other.

The slide pusher and slide stack lifter members of the cassette 102 operates in a similar manner to that of the cassette 2 previously described to circulate slides in one direction or the other through the cassette.

It should be understood that numerous modifications may be made in the forms of the invention described above without deviating from the broader aspects thereof. For example, while the cassettes 2 and 102 described are designed to fit around a projection lamp, they may be modified so as to fit around a reflection mirror so that light is directed through the slides at the slide projection station from one side of the cassette into the mirror located in the center of the cassette, which mirror reflects the light horizontally through an opening which must be provided, in such case, in the front vertical longitudinal wall of the cassettes involved.

I claim:

1. In a slide transparency projector, the improvement comprising: a removable cassette body having a pair of horizontally spaced confronting slide holding compartments each of a size to receive a single vertical stack of horizontally oriented slides in face-to-face relation, a pair of open ended horizontally extending slide tracks, each at least of the length of about one slide and respectively interconnecting the confronting upper and lower ends of the slide holding compartments, there being a light transparent area in the lower of said slide tracks at a position thereof constituting a slide projecting station and through which area slide projecting light can pass vertically to project the picture on a slide at said slide projecting station, said cassette body having slide pusher-receiving means adjacent the top and bottom of each of said slide holding compartments, separate slide pusher means movable in said slide pusher-receiving means into positions respectively for engaging the outer edge of the adjacent slide at the bottom and top of the slide holding compartments and moving a distance horizontally to push a slide into the adjacent slide holding tracks, whereby slides can be moved from either slide holding compartment into the slide track having said projecting station and slides can be circulated in either direction through said slide tracks and slide holding compartments, slide stack shifter-receiving means at the bottom of each slide holding compartment; and slide stack shifter means movable in said slide stack shifter-receiving means into positions respectively at the bottom of said compartments to raise at least the inner sides of the associated slide stacks above the lower slide track where a new slide entering the slide compartment involved will not engage the edges of a slide already in the compartment involved, and at least one of said cassette body slide holding compartments having a defining wall which is movable into a slide compartment opening position to permit the insertion of a stack of slides into the associated slide holding compartment.

2. The projector of claim 1 wherein there is provided in said cassette body between said spaced slide holding compartments and slide tracks a space for receiving a light projecting means of said projector when the cassette is inserted into said projector.

3. The projector of claim 1 wherein said cassette body slide holding compartments have top and bottom walls defining the upper and lower extremities of said slide holding compartments, and said slide pusher-receiving means include at least one horizontally extending slot in each of said top and bottom walls of the slide holding compartments for receiving said slide pusher means movable horizontally through and along each of said slots to engage and push an exposed edge of the slide in the slide holding compartment involved, said slide pusher means being supported externally of said cassette body so the removable cassette body does not include said slide pusher means.

4. The projector of claim 3 wherein each of said cassette body slide shifter-receiving means is an opening in the bottom wall of the slide holding compartment involved for permitting the passage of said slide stack shifter means which is positioned out of the path of travel of the associated slide pusher means, said slide stack shifter means being supported externally of said cassette body so the removable cassette body does not include said slide stack shifter means.

5. The projector of claim 1 wherein said cassette body slide shifter-receiving means at the bottom of said slide holding compartments are passageways in the cassette body which do not extend through the cassette body walls which act as substantial dust shields for the slides in the slide holding compartments, and said cassette body is combined with and carries said slide stack shifter means and actuator means for said slide shifter means which actuator means are connected to said slide stack shifter means, and there is provided projector mounted operator means for operating the slide stack shifter means.

6. The projector of claim 5 wherein said slide pusher-receiving means at the top and bottom of said slide holding compartments are passageways in the cassette body which do not extend through the cassette body walls which act as substantial dust shields for the slides in the slide holding compartments, and said cassette body is combined with and carries said slide pusher means which are slidable in said passageway.

7. The projector of claim 1 wherein said cassette body includes slides in said slide holding compartments at least equal in number of the maximum number of slides which can be accommodated in the slide holding compartment which contains the stack of slides to be shifted plus at least three additional slides.

8. In a slide transparency projector, the improvement comprising: a removable cassette body having a pair of horizontally spaced confronting slide holding compartments each of a size to receive a single vertical stack of horizontally oriented slides in face-to-face relation, a pair of open ended horizontally extending slide tracks, each at least of the length of about one slide and respectively interconnecting the confronting upper and lower ends of the slide holding compartments, there being a light transparent area in the lower of said slide tracks at a position thereof constituting a slide projecting station and through which area slide projecting light can pass vertically to project the picture on a slide at said slide projecting station, said cassette body having slide pusher-receiving means adjacent the top and bottom of each of said slide holding compartments, separate slide pusher means movable in said slide pusher-receiving means into positions respectively for engaging the outer edge of the adjacent slide at the bottom and top of the slide holding compartments and moving a distance horizontally to push a slide into the adjacent slide holding tracks, whereby slides can be moved from either slide holding compartment into the slide track having said projecting station and slides can be circulated in either direcion through said slide tracks and slide holding compartments, slide stack shifter-receiving means at the bottom of each slide holding compartment; and slide stack shifter means movable in said slide stack shifter-receiving means into positions respectively at the bottom of said compartments to raise at least the inner sides of the associated slide stacks above the lower slide track where a new slide entering the slide compartment involved will not engage the edges of a slide already in the compartment involved and both of said cassette body slide holding compartments having respective defining walls which are movable into a slide compartment opening position permitting the insertion of a stack of slides in each of said slide holding compartments.

9. A cassette for slide transparencies comprising: a cassette body insertable into and removable from a projector housing, said cassette body having a pair of horizontally spaced confronting slide holding compartments each of a size to receive a single vertical stack of horizontally oriented slides in face-to-face relation, a pair of open ended horizontally extending slide tracks each at least of the length of about one slide and respectively interconnecting the confronting upper and lower ends of the slide holding compartments, there being a light transparent area in one of said slide tracks at a position thereof constituting a slide projecting station and through which area slide projecting light can pass to project the picture on a slide at said slide projecting station, said cassette body having separate slide pusher-receiving means adjacent the top and bottom of each of said slide holding compartments, said slide pusher-receiving means at the top and bottom of each slide holding compartment being passageways in the cassette body which do not extend through the cassette body walls which act as substantial dust shields for the slides in the slide holding compartments, and said cassette body carrying a separate slide pusher means slidably disposed in each of said passageways and actuator means connected to each of said slide pusher means which actuator means are adapted to be engaged by a projector mounted operator means for operating the same, one of said slide pusher means being positioned to engage the outer edge of the adjacent slide at the bottom or top of the slide holding compartment involved and move a distance horizontally to push a slide into the adjacent slide holding track, whereby slides can be moved from either slide holding compartment into the slide track having said projecting station and slides can be circulated in either direction through said slide tracks and slide holding compartments.

10. The cassette of claim 9 wherein the slide pusher means at the top and bottom of each slide holding compartment includes a pair of laterally spaced slide abutment means positioned to engage edge portions of a slide spaced on opposite sides of the slide to be engaged, each pair of slide abutment means being carried on a common laterally extending arm, each laterally extending arm forming said actuator means and being connected to a longitudinally extending member which is out of alignment with the corresponding longitudinal member associated with the slide abutment means at the same elevation at the opposite end of the cassette body and being exposed to the outside of the cassette body to be engaged by a projector mounted operator means.

11. A cassette for slide transparencies comprising: a cassette body insertable into and removable as a unit from a projector housing; said cassette body having a pair of horizontally spaced confronting slide holding compartments each of the size to receive a single vertical stack of horizontally oriented slides in face-to-face relation; upper and lower open ended, generally horizontally extending, slide tracks, each at least the length of about one slide, respectively interconnecting the confronting upper and lower ends of the slide holding compartments, there being a light transparent area in one of said tracks at a position thereof constituting a slide projecting station and a space between said slide holding compartments and between said slide tracks for passage of light projected or to be projected through the slide at said slide projecting station of said one slide track, at least one pair of slide pusher receiving means, one of which is located in the bottom of one of said slide holding compartments and the other of which is located adjacent the upper end of the other slide holding compartment, said slide pusher-receiving means permitting horizontal movement of respective slide pusher means respectively against the outer edge of an adjacent slide at the bottom of one of the slide holding compartments and the top of the other slide holding compartment and move the same a distance horizontally to push a slide into the adjacent slide holding track, the slide moving into such slide holding track pushing a slide previously on the track into the other slide holding compartment, the slides thereby circulating in at least one direction through and between said slide tracks and slide holding compartments, and at least a portion of said slide track located at said slide projecting station having a slide supporting portion upon which the slide to be projected rests, which portion is movable from a normal slide projecting position to a position which exposes the slide permitting the user to remove and return the slide with a different orientation upon said surface or to replace the original slide by another slide.

12. A cassette for slide transparencies comprising: a cassette body insertable into and removable as a unit from a projector housing; said cassette body having a pair of horizontally spaced confronting slide holding compartments each of the size to receive a single vertical stack of horizontally oriented slides in face-to-face relation; upper and lower open ended, generally horizontally extending, slide tracks, each at least the length of about one slide, respectively interconnecting the confronting upper and lower ends of the slide holding compartments, there being a light transparent area in one of said tracks at a position thereof constituting a slide projecting station and a space between said slide holding compartments and between said slide tracks for passage of light projected or to be projected through the slide at said slide projecting station of said one slide track, at least one pair of slide pusher receiving means, one of which is located in the bottom of one of said slide holding compartments and the other of which is located adjacent the upper end of the other slide holding compartment, said slide pusher-receiving means permitting horizontal movement of respective slide pusher means respectively against the outer edge of an adjacent slide at the bottom of one of the slide holding compartments and the top of the other slide holding compartment and move the same a distance horizontally to push a slide into the adjacent slide holding track, the slide moving into such slide holding track pushing a slide previously on the track into the other slide holding compartment, the slides thereby circulating in at least one direction through and between said slide tracks and slide holding compartments, said slide pusher-receiving means being passageways in the cassette body which do not extend through the cassette body walls which act as substantial dust shields for the slides in the slide holding compartments, and said cassette body is combined with said slide pusher means which are slidable in said passageways, and said cassette body also combined with and carrying actuator means connected to each of said slide pusher means which actuator means are adapted to be engaged by a projector mounted operator means for operating the same.

13. The cassette of claim 12 wherein the cassette body carries separate slide pusher means adjacent the top and bottom of each of said slide holding compartments which engage the outer edge of an adjacent side at the bottom or top of the slide holding compartment involved and move a distance horizontally to push the slide into the adjacent slide holding track, whereby slides can be moved from either slide holding compartment into the slide track having said projection station and slides can be circulated in either direction through said tracks and slide holding compartments.

14. The cassette of claim 12 wherein the slide pusher means at the top and bottom of each slide holding compartment includes a pair of laterally spaced slide abutment means positioned to engage edge portions of a slide spaced on opposite sides of the slide to be engaged, each pair of slide abutment means being carried on a common laterally extending arm, each laterally extending arm forming said actuator means and being connected to a longitudinally extending member which is out of alignment with the corresponding longitudinal member associated with the slide abutment means at the same elevation at the opposite end of the cassette body and being exposed to the outside of the cassette body to be engaged by a projector mounted operator means.

15. The cassette of claim 13 wherein the slide pusher means at the top and bottom of each of said slide holding compartments is connected to a longitudinally extending member which is out of alignment with the corresponding longitudinal member associated with the corresponding slide pusher means on the opposite end of the cassette body, each longitudinally extending member extending the full length of the cassette body and exposed to the ends thereof through horizontally facing openings aligned therewith, so the longitudinally extending members can be pushed to extend beyond the cassette body by projector mounted operator means positioned at opposite ends of the cassette body which operator means enter and leave said horizontally facing openings.

16. The cassette of claim 13 wherein said lower slide track has said light transparent area to form said slide projection station, and there is mounted in the bottom of said cassette body opposite the bottom of each of said slide holding compartments slide stack lifter means mounted for movement between a raised position where it projects into the associated slide holding compartment and a lowered position means where it is below said slide holding compartment, each of said stack lifter means adapted to engage a stack of slides in the slide holding compartment above the same to lift at least the side thereof facing the lower slide track above the elevation thereof, said slide stack lifter means being connected to actuator means exposed from the bottom of the slide cassette body to permit the engagement therewith of projector mounted operator means for raising and lowering the slide stack lifter means.

17. The cassette of claim 16 wherein said slide stack lifter means mounted opposite the bottom of each of said slide holding compartments are mounted on a common rocking frame mounted for pivotal movement along a lateral axis at the bottom of the cassette body, said rocker frame having portions positioned on opposite sides of said pivot axis exposed through openings in the bottom of the cassette body and adapted to receive said projector mounted operator means to rock the frame in one direction or the other to raise or lower said stack lifter means mounted opposite the bottom of said slide holding compartments.

* * * * *